United States Patent [19]

Mothersbaugh et al.

[11] Patent Number: 5,070,910
[45] Date of Patent: Dec. 10, 1991

[54] DIVERTER VALVE WITH IMPROVED SEALING MEANS

[75] Inventors: James E. Mothersbaugh; Galen S. Ingram, both of Muncy; Andrew P. Mitchell, Montoursville, all of Pa.

[73] Assignee: The Young Industries, Inc., Muncy, Pa.

[21] Appl. No.: 693,564

[22] Filed: Apr. 30, 1991

[51] Int. Cl.$^5$ .......................................... F16K 11/085
[52] U.S. Cl. ................................. 137/625.47; 251/175
[58] Field of Search ...................... 137/625.41, 625.47; 251/175

[56] References Cited

U.S. PATENT DOCUMENTS

| | | | |
|---|---|---|---|
| 2,996,083 | 8/1961 | Huska | 137/625.47 X |
| 3,475,004 | 10/1969 | Jennings | 251/175 |
| 3,692,056 | 9/1972 | Kirkwood | 251/175 X |
| 4,252,479 | 2/1981 | Scherfenberg | . |
| 4,264,244 | 4/1981 | Steele | . |
| 4,449,863 | 5/1984 | Ullner | 137/625.47 X |
| 4,836,250 | 6/1989 | Krambrock | 251/75 X |

Primary Examiner—Robert G. Nilson
Attorney, Agent, or Firm—Lalos & Keegan

[57] ABSTRACT

A diverter valve adapted for use in a pneumatic conveying system for transporting bulk materials comprising a housing having a chamber provided with a cylindrical wall, the cylindrical wall having an inlet port communicating with an inlet passageway in the housing and first and second outlet ports communicating with first and second passageways in the housings, respectively, a rotor disposed in the chamber and having a cylindrical wall disposed in opposed relation to the chamber cylindrical wall, the rotor cylindrical wall having first and second ports and an intercommunicating passageway, the rotor ports being spaced apart a sufficient distance whereby upon the rotor being rotated into a first position relative to the housing, the first rotor port will register with the housing inlet port and the second rotor port will register with the first housing outlet port to intercommunicate the housing inlet passageway with the first housing outlet passageway, and upon the rotor being rotated into a second position relative to the housing, the second rotor port will register with the housing inlet port and the first rotor port will register with the second housing outlet port to intercommunicate the housing inlet passageway with the second housing outlet passageway, the rotor cylindrical wall having a groove disposed about each port thereof and an inflatable seal disposed in each of the grooves.

10 Claims, 3 Drawing Sheets

DIVERTER VALVE WITH IMPROVED SEALING MEANS

This invention relates to diverter valves and more particularly to diverter valves adapted for use with pneumatic conveying systems for transporting bulk material such as powders, pellets, chips, grains, granules and the like. The invention further relates to a diverter valve having improved sealing means.

Diverter valves adapted for use with pneumatic conveying systems for transporting bulk materials typically consist of a housing having a rotor chamber provided with a cylindrical wall, a rotor disposed in the chamber and having a fluid passageway therethrough adapted to intercommunicate an inlet passageway and a first outlet passageway of the housing when the rotor is disposed in a first position, and to intercommunicate the inlet passageway and a second outlet passageway of the housing when the rotor is disposed in a second position. Most commonly, sealing between the rotor and the housing for minimizing leakage in the system is obtained by providing a close tolerance between the outer cylindrical wall of the rotor and the mating wall of the rotor chamber. Sliding and rubbing seals also have been used to reduce internal leakage in such valves. Some valves further provide purge ports to permit compressed air to be injected into the clearance space between the rotor and the housing to purge particles therefrom.

In valves relying upon close tolerances for sealing, the clearance must be in the order of 0.003 to 0.009 inches, depending upon the diameter of the rotor chamber, to effectively reduce leakage. Holding such tolerances, however, often results in several disadvantages and problems. Such small clearances require precision machining which requires greater skill and is more costly. In addition, special care must be taken to assure that the mating cylindrical walls of the rotor and rotor chamber are precisely concentric. Another disadvantage of such valves is that their operating pressures are limited to 15 psi in order to avoid excessive leakage. Such valves are suitable for dilute phase pneumatic conveying utilizing comparatively lower operating pressures but are not practical for dense phase pneumatic conveying which requires substantially higher operating pressures.

Another problem incurred in valves relying upon close tolerances for sealing is rotor seizure caused by thermal expansion of the rotor. When conveying heated products, the rotor is apt to expand at a greater rate than the housing because of material differences which could cause the rotor to seize within the housing. For valves intended for use with product temperatures above 200° F., additional clearance is required to compensate for thermal expansion. Such larger clearances, however, result in additional leakage prior to the valve reaching operating temperature.

A more recent development in the sealing of diverter valves has been the use of inflatable seals. While such seals provide certain advantages over prior art seals, they have been found to be costly in design.

Accordingly, it is the principal object of the present invention to provide a diverter valve having improved sealing means.

Another object of the present invention is to provide a diverter valve suitable for use in pneumatic conveying systems for transporting bulk materials, having improved sealing means.

A further object of the present invention is to provide a diverter valve suitable for use in pneumatic conveying systems for transporting bulk materials, having improved inflatable sealing means.

A still further object of the present invention is to provide a diverter valve suitable for use in pneumatic conveying systems having operating pressures up to 100 psi.

Another object of the present invention is to provide a diverter valve suitable for use in pneumatic conveying systems, having operating temperatures up to 200° F.

A further object of the present invention is to provide a diverter valve having improved sealing means in which precise machining of mating surfaces of the rotor and housing thereof, seizure of the rotor within the housing and undue wear of the seals are avoided.

A still further object of the present invention is to provide a diverter valve suitable for use in pneumatic conveying systems having improved sealing means which are simple in construction, comparatively easy to fabricate and highly effective in performance.

Other objects and advantages of the present invention will become more apparent to those persons having ordinary skill in the art to which the present invention pertains from the following description taken in conjunction with the accompanying drawings wherein.

Figure 1:
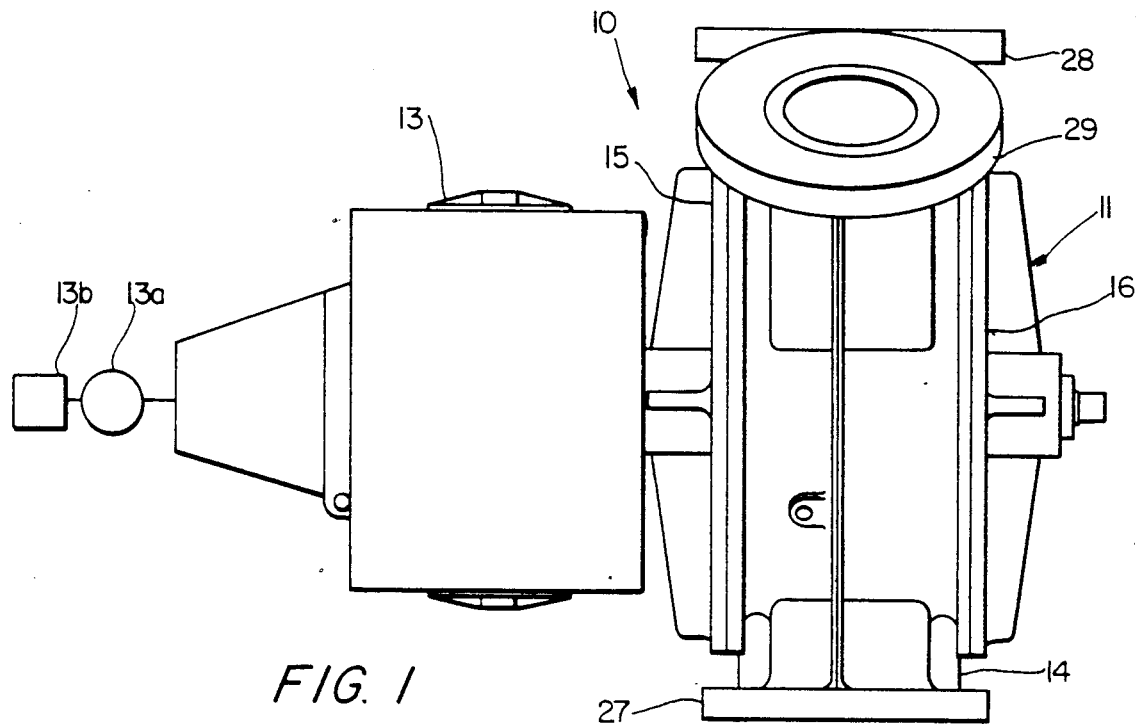
FIG. 1 is a side elevational view of a diverter valve suitable for use with a pneumatic conveying system for transporting bulk materials, embodying the present invention.
Figure 2:
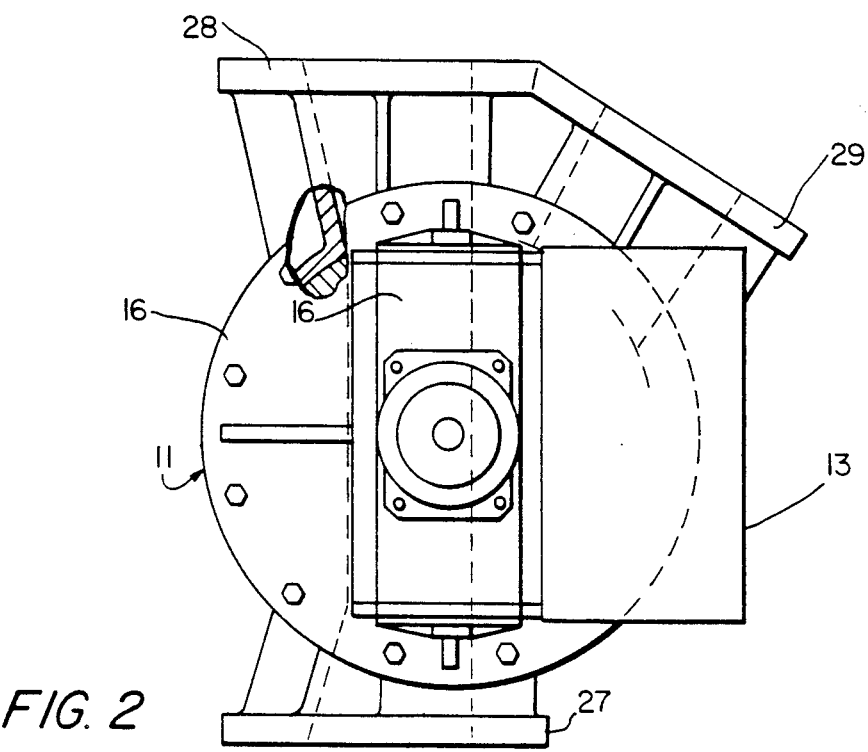
FIG. 2 is an end view of the embodiment shown in FIG. 1, having portions thereof broken away.
Figure 3:
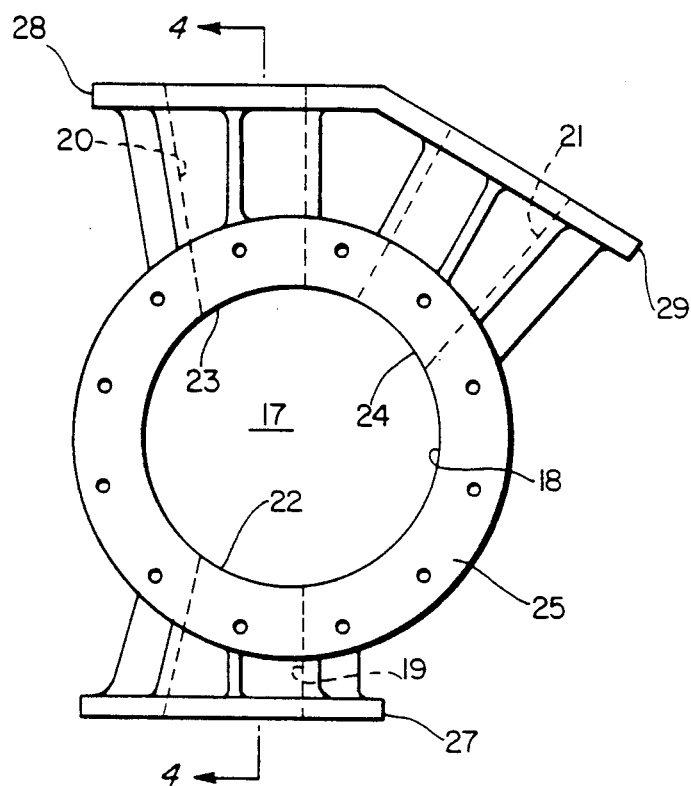
FIG. 3 is an end view of the housing component of the embodiment shown in FIG. 1 having an end plate and the rotor thereof removed.
Figure 4:
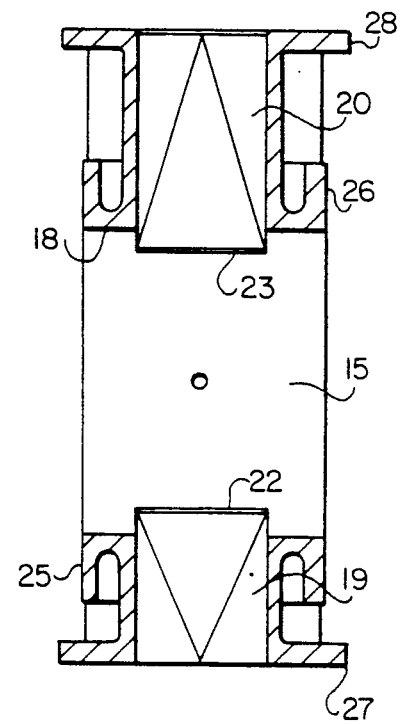
FIG. 4 is a cross-sectional view taken along line 4—4 in FIG. 3.

Referring to the drawings, there is illustrated an embodiment of the invention consisting of a diverter valve 10 generally including a housing 11 adapted to be installed in a pneumatic conveying system for transporting bulk materials, a rotor 12 mounted within the housing and an actuator 13 mounted on the housing and operatively connected to the rotor to rotate it between first and second positions relative to the housing. The housing consists of a main housing section 14 and a pair of end plates 15 and 16. As best shown in FIGS. 3 and 4, main housing section 14 is provided with a rotor chamber 17 having a cylindrical wall 18. Also provided in main housing section 14 are a product inlet passageway 19 and a pair of product outlet passageways 20 and 21. Passageway 19 is disposed substantially radially relative to cylindrical wall 18 and is provided with an inlet port 22 in cylindrical wall 18 communicating with the rotor chamber. Passageway 20 is aligned with passageway 19 and is provided with an outlet port 23 also in cylindrical wall 18, communicating with the rotor chamber. Passageway 21 also is angularly offset relative to passageway 19 and is provided with an outlet port 24 in cylindrical wall 18, communicating with the rotor chamber. Cylindrical wall 18 cooperates with end plates 15 and 16 mounted on annular surfaces 25 and 26, respectively, to provide rotor chamber 17. Housing section 14 and end plates 15 and 16 may be of either a cast or fabricated construction and may be formed of any suitable material including mild steel, stainless steel and aluminum Preferably end plates 15 and 16 are bolted to the housing section to permit disassembly of the valve for repair and maintenance purposes Housing section 14 further is provided with mounting flanges 27, 28 and 29 to permit the valve to be operatively connected to pipeline segments of a pneumatic conveying system.

Figure 5:
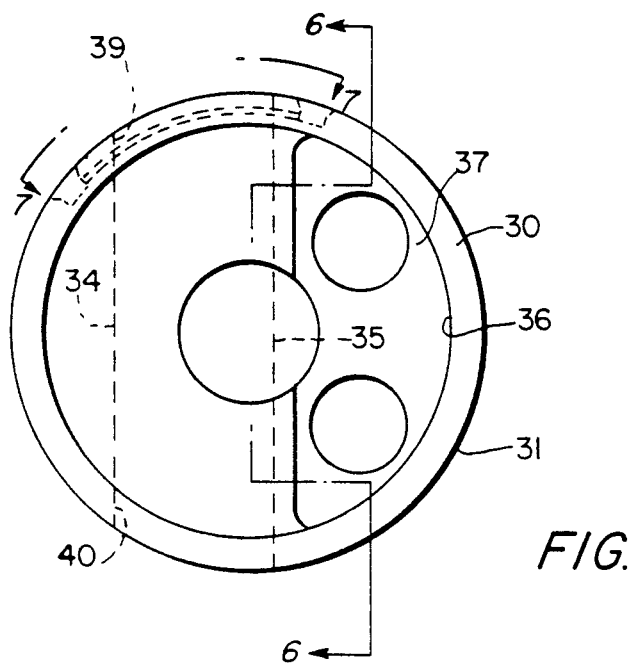
FIG. 5 is an enlarged, side elevational view of the rotor utilized in the embodiment shown in FIGS. 1 through 4.
Figure 6:
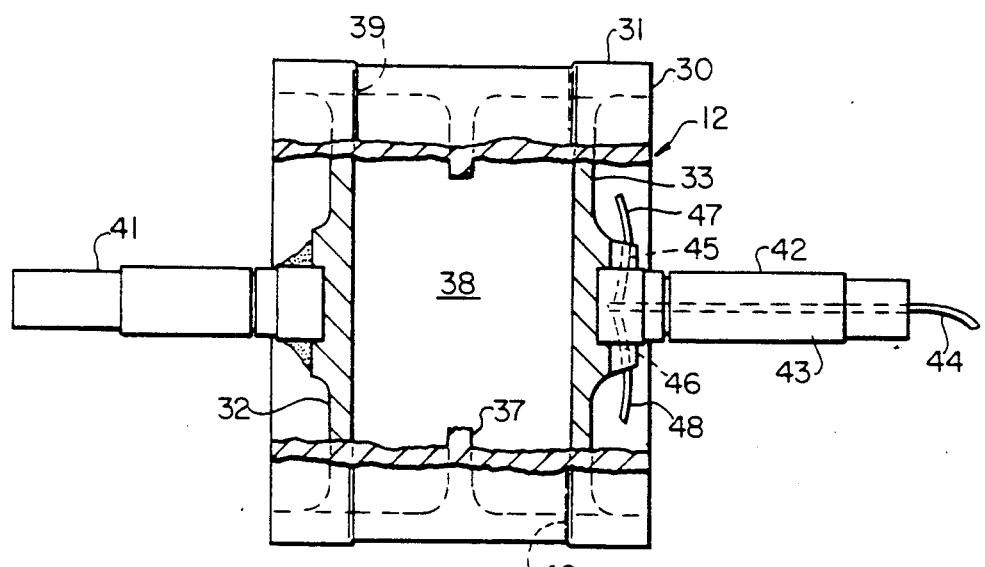
FIG. 6 is a cross-sectional view taken along line 6—6 in FIG. 5.

Referring to FIGS. 5 and 6, rotor 12 consists of an annular wall section 30 providing a cylindrical outer surface 31, a pair of end wall sections 32 and 33 and a pair of side wall sections 34 and 35 interconnecting an inner cylindrical wall surface 36, and a reinforcing wall 37 interconnecting side wall section 35 and interior surface 36 of annular wall section 30. Wall sections 32 through 35 define a passageway 38 provided with a set of ports 39 and 40 in cylindrical surface 31. As best shown in FIG. 5, the centerline of passageway 38 is offset relative to a diameter of cylindrical wall section 30 so that when the rotor is in a first position relative to housing section 14, port 39 will register with outlet port 23 and port 40 will register with port 22 and rotor passageway 38 will intercommunicate housing passageways 19 and 20, and when the rotor is in a second position relative to housing section 14, rotor port 39 will register with housing port 22 and rotor port 40 will register with housing port 24 and rotor passageway 38 will intercommunicate housing passageways 19 and 21.

As best shown in FIG. 6, a pair of shaft sections 41 and 42 are secured to end wall sections 32 and 33, and are disposed coaxially relative to cylindrical surface 31. When the rotor is disposed within rotor chamber 17, shaft sections 41 and 42 are adapted to be journaled in end plates 15 and 16 with shaft section 41 projecting through end plate 15 and being operatively connected to actuator 13. As best shown in FIG. 6, shaft section 42 is provided with an axially disposed fluid passageway 43 having a fluid line 44 disposed at an outer end thereof and adapted to be connected to a source of fluid under pressure, and a pair of branch passageways 45 and 46 having fluid lines 47 and 48 which are connected to a pair of inflatable seals positioned in annular wall section 30 of the rotor.

Figure 8:
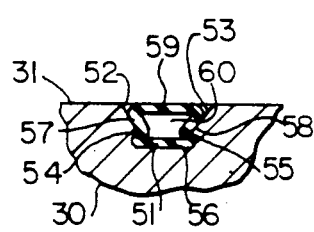
FIG. 8 is an enlarged, cross-sectional view taken along line 8—8 in FIG. 7.
Figure 7:
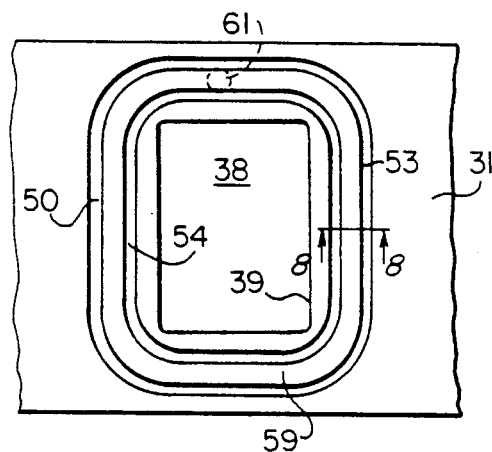
FIG. 7 is a cross-sectional view taken along either of lines 7—7 in FIG. 6.
Figure 9:
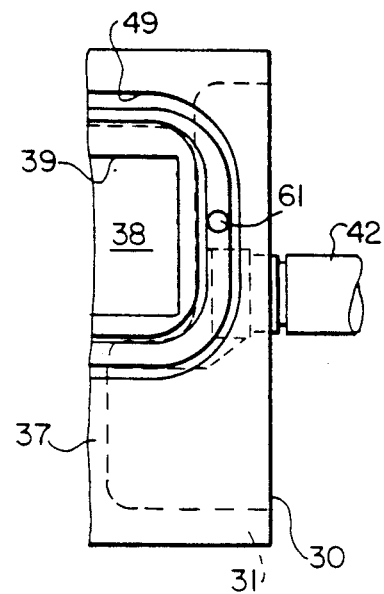
FIG. 9 is a top plan view of a portion of the rotor shown in FIGS. 5 through 8.

Formed on cylindrical surface 31 of the rotor and circumscribing rotor port 39 is a groove 49 in which there is seated an inflatable seal 50. As best shown in FIGS. 8 and 9, groove 49 includes a bottom wall 51 and a pair of side walls 52 and 53 having inwardly projecting wall portions 54 and 55. The seal includes a bottom wall 56 adapted to be seated on bottom wall 51 of the groove with the end portions thereof disposed within the undercuts of projecting wall portions 54 and 55, a pair of side walls 57 and 58 recessed to receive projecting wall portions 54 and 55 of the groove wall, and a top wall 59, providing an annular air chamber 60. Fluid line 47 extends through an opening 61 provided in annular wall section 30 and communicates with chamber 60 of the seal so that when air under pressure is supplied to air line 44, the seal will be caused to inflate and when air line 44 is vented, the seal will be caused to collapse. A similar groove and seal is provided in annular wall section 30 about rotor port 40, in which such seal is connected to a fluid source through fluid line 48.

In the manufacture of the components, the clearance between rotor surface 31 and housing surface 18 can be increased from conventional clearances of 0.003 to 0.009 inches to 0.025 inches or more to preclude any seizure of the rotor within the valve housing as a result of any thermal expansion of the rotor. Furthermore, the seal used in the valve will have a collapsed or deflated height preferably no greater than the depth of recess 49 so that when in the collapsed or deflated condition, it will be disposed within the groove and thus not interfere with the rotation of the rotor but when fully inflated, will extend beyond surface 31 of the cylinder and engage cylindrical wall 18 of the valve housing to provide a fluid-tight seal therebetween. With such seals, a system in which the valve is used may be operated at pressures up to 100 psi. Under such conditions, the seals would be pressurized at pressures 20 to 30 psi greater than the operating pressure of the system.

Actuator 13 preferably consists of a conventional rotary actuator provided with a solenoid control valve 13a and a controller 13b for operating the solenoid valve.

In assembling the various components of the valve, end plate 15 may first be mounted on housing section 14. Seals 50 may then be inserted and seated in grooves 49 and fluid lines 47 and 4 may be passed through the openings in rotor wall section 30 and connected to branch passageways 45 and 46. With the rotor thus assembled, it may be inserted into rotor chamber 17 so that shaft section 41 is inserted into and becomes journaled in end plate 15. End plate 16 may then be secured to housing section 14 with shaft section 43 journaled therein. The actuator unit is then mounted on end plate 15 with shaft section 41 operatively connected to the rotor actuator therein. The valve is then in condition to be installed in a pneumatic conveying system by securing pipeline sections to mounting flanges 27 through 29. Upon installation in a conveying system, the actuator is electrically connected to a controller and fluid line 44 is connected to a source of fluid under pressure. The supply line for the seals further would be provided with a solenoid control valve operable by the controller to selectively pressurize and vent the seals.

In operation, assuming the rotor is in a first position intercommunicating housing passageways 19 and 20 and the seals are inflated to prevent any internal air leakage, the solenoid valve in the air supply line is energized, allowing air from the seals to be vented to the atmosphere. Under such conditions, the seals will deflate and contract within the grooves in wall section 30 to permit rotation of the rotor. Following a time delay to allow the seals to deflate sufficiently, the position changing solenoid valve is energized causing the rotary actuator to rotate the rotor to a second position to intercommunicate housing passageways 19 and 20. Once the rotor is in the second position, the solenoid valve controlling the air supply is energized to reinflate the seals and provide an airtight sealing condition between the rotor and the housing about ports 22 and 24. The same process may be reversed to again intercommunicate housing passageways 19 and 20.

The controller provided to operate the valves for the rotary actuator and the air supply for the seals, further provides the proper timing of the deflation of the seals, the rotation of the rotor and the inflation of the seals to prevent damage to the outer surfaces of the seals, and to prevent excessive friction between the rotor and the housing. The configuration of the side walls of the grooves and the cross-sectional configurations of the seals insure that the seals will remain firmly seated in the grooves and will readily extend beyond and contract within the confines of the grooves during repeated inflation and deflation cycles of the seals.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A diverter valve adapted for use in a pneumatic conveying system for transporting bulk materials comprising:

a housing having a chamber provided with a cylindrical wall, said cylindrical wall having an inlet port communicating with an inlet passageway in said housing and first and second outlet ports communicating with first and second passageways in said housings, respectively;

a rotor disposed in said chamber and having a cylindrical wall disposed in opposed relation to said chamber cylindrical wall, said rotor cylindrical wall having first and second ports and an intercommunicating passageway;

said rotor ports being spaced apart a sufficient distance whereby upon said rotor being rotated into a first position relative to said housing, said first rotor port will register with said housing inlet port and said second rotor port will register with said first housing outlet port to intercommunicate said housing inlet passageway with said first housing outlet passageway, and upon said rotor being rotated into a second position relative to said housing, said second rotor port will register with said housing inlet port and said first rotor port will register with s id second housing outlet port to intercommunicate said housing inlet passageway with said second housing outlet passageway;

said rotor cylindrical wall having a groove disposed about each port thereof; and an inflatable seal disposed in each of said grooves.

2. A diverter valve according to claim 1 including means for selectively positioning said rotor in said first and second positions.

3. A diverter valve according to claim 1 wherein said inflatable seals include means for selectively communicating said seals with a source of fluid under pressure for selectively inflating and deflating said seals.

4. A diverter valve according to claim 1 wherein the clearance between said housing cylindrical wall and said rotor cylindrical wall is sufficiently large to prevent seizure of said rotor within said housing upon thermal expansion thereof.

5. A diverter valve according to claim 1 wherein the clearance between said rotor cylindrical wall and said housing cylindrical wall is at least 0.025 inches.

6. A diverter valve according to claim 1 wherein each of said seals has an outer wall disposable within the groove thereof when said seal is in the deflated condition to prevent contact thereof with said cylindrical chamber wall to prevent engagement with said cylindrical chamber wall, and disposable without the groove thereof when said seal is in the inflated condition to provide contact thereof with said cylindrical chamber wall in fluid tight sealing relation therewith.

7. A diverter valve according to claim 1 wherein at least one side wall of each groove includes an inwardly projecting portion and said seal seated in said groove includes a recessed portion receiving said projecting wall portion to enhance the seating of said seal in preventing removal thereof upon inflation.

8. A diverter valve according to claim 1 wherein a shaft portion of said rotor includes a fluid passageway, said seals include means intercommunicating the chambers of said seals with said passageway and said fluid passage way is communicable with a source of fluid under pressure.

9. A diverter valve according to claim 2 wherein said positioning means comprises a rotary actuator.

10. A diverter valve according to claim 9 including a solenoid control valve operable for selectively supplying fluid under pressure to opposite sides of said rotary actuator for selectively positioning said rotor in said first and second positions.

* * * * *